United States Patent [19]
Clark et al.

[11] Patent Number: 6,118,482
[45] Date of Patent: Sep. 12, 2000

[54] METHOD AND APPARATUS FOR ELECTRICAL TEST OF CMOS PIXEL SENSOR ARRAYS

[75] Inventors: Lawrence T. Clark, Phoenix; Mark A. Beiley; Eric J. Hoffman, both of Chandler, all of Ariz.

[73] Assignee: Intel Corporation, Santa Clara, Calif.

[21] Appl. No.: 08/986,499

[22] Filed: Dec. 8, 1997

[51] Int. Cl.[7] .......................... H04N 5/335; H04N 17/00
[52] U.S. Cl. ............................................ 348/308; 348/181
[58] Field of Search .................................. 348/302, 308, 348/296, 247, 181, 187; 378/98.8; 250/208.1

[56] References Cited

U.S. PATENT DOCUMENTS

| | | | |
|---|---|---|---|
| 4,326,219 | 4/1982 | Griesshaber | 348/181 |
| 5,535,011 | 7/1996 | Yamagami et al. | 358/335 |
| 5,892,541 | 4/1999 | Merrill | 348/302 |

OTHER PUBLICATIONS

Iida et al.; "A 1/4-Inch 330k Square Pixel Progressive Scan CMOS Active Pixel IMage Sensor", IEEE Journal of Solid-State Circuits, vol. 32, No. 11, Nov. 1997.

*Primary Examiner*—Wendy Garber
*Assistant Examiner*—Andrew B. Christensen
*Attorney, Agent, or Firm*—Blakely, Sokoloff, Taylor & Zafman LLP

[57] ABSTRACT

CMOS pixel sensors have been of interest as replacements for CCD's in imaging applications. Such devices promise lower power and simpler system level design through fewer power supply voltages and higher functional integration. It is difficult and cost ineffective to utilize images to test active pixel sensors. Here, a method and apparatus for electrical testing of CMOS pixel sensors is described which involves electrically writing a pattern into the CMOS pixel sensors for the detection of adjacent cell shorts or stuck at faults as well as verification of read-channel circuit functionality and performance. The invention provides for an electrical testing of CMOS pixel array that is simple, time efficient and cost effective for use in, for example, production.

26 Claims, 17 Drawing Sheets

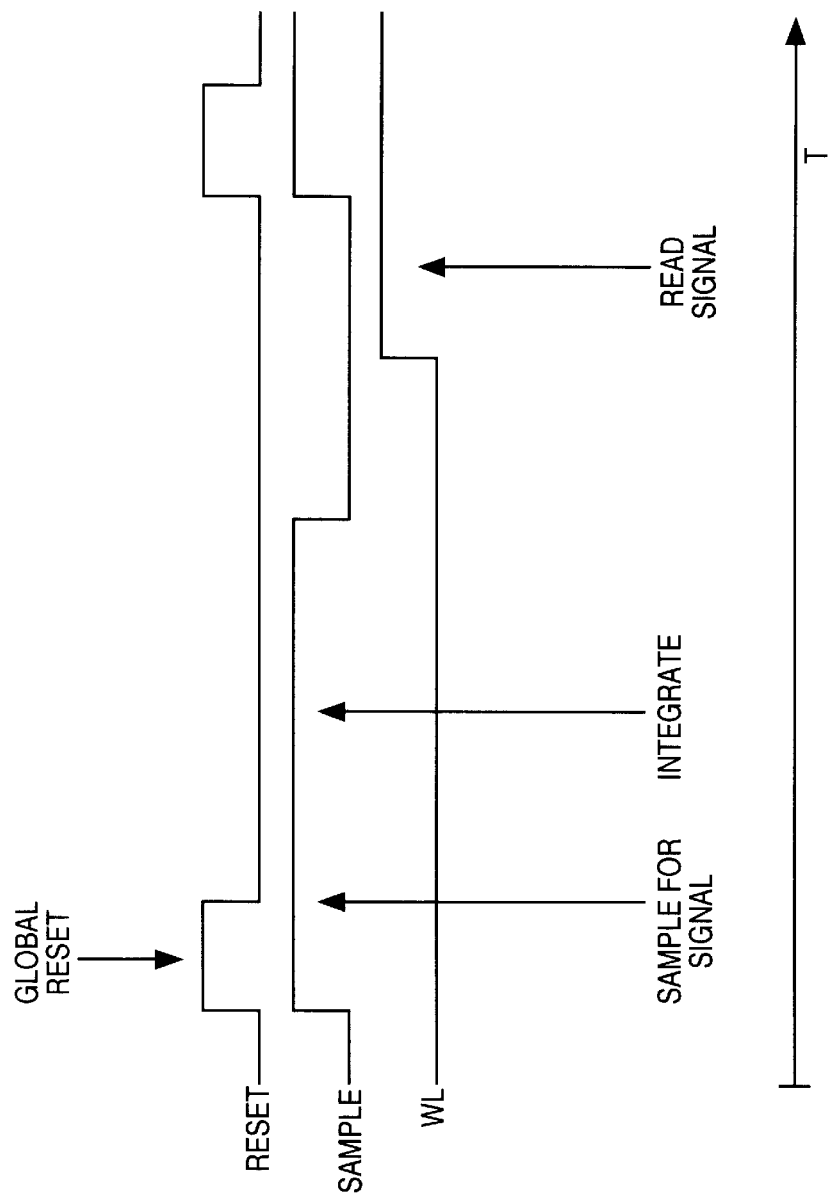

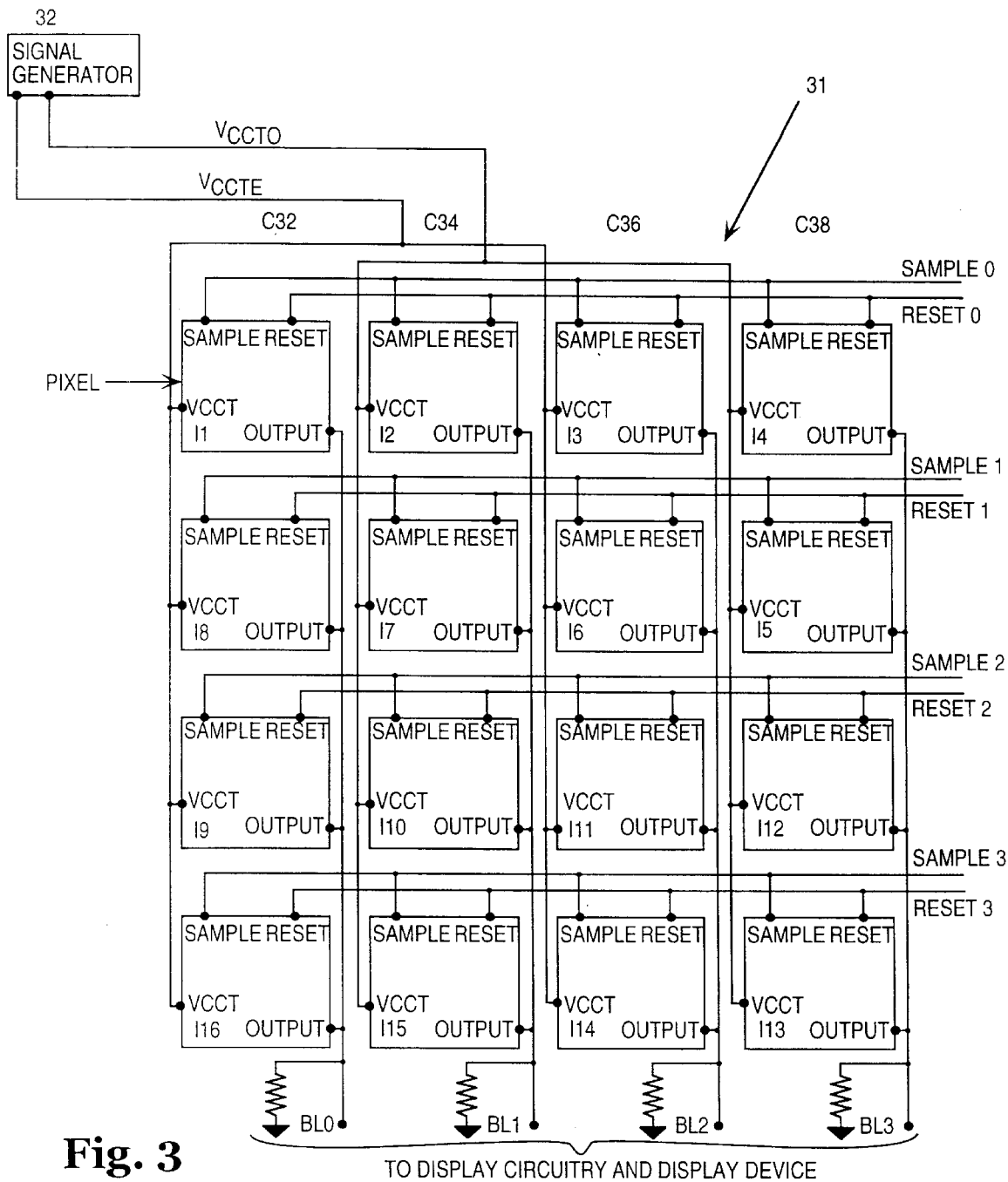
Fig. 3   TO DISPLAY CIRCUITRY AND DISPLAY DEVICE

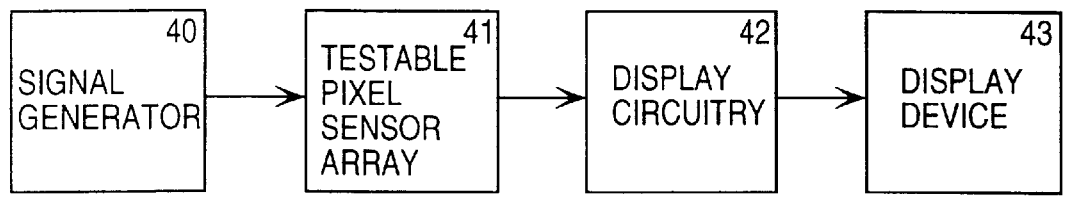
Fig. 4
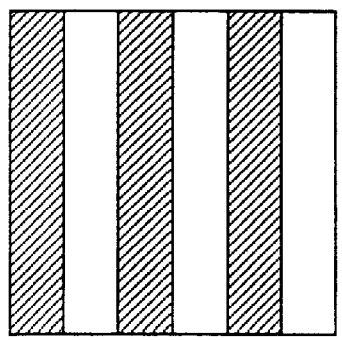
(A)
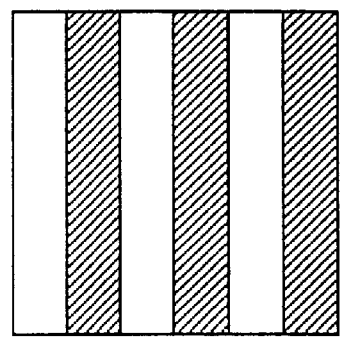
(B)
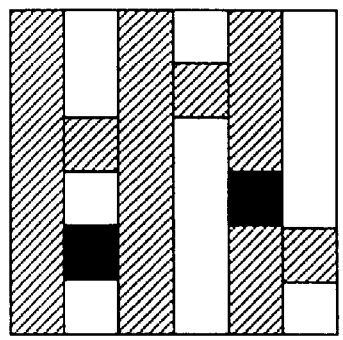
(C)
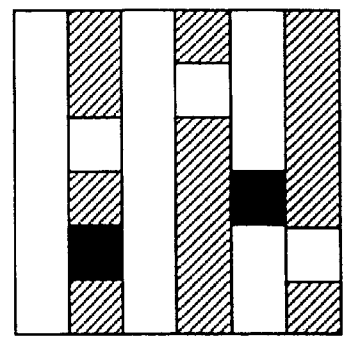
(D)
Fig. 5

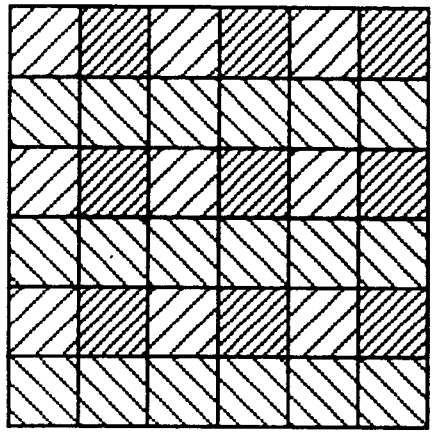
(A)
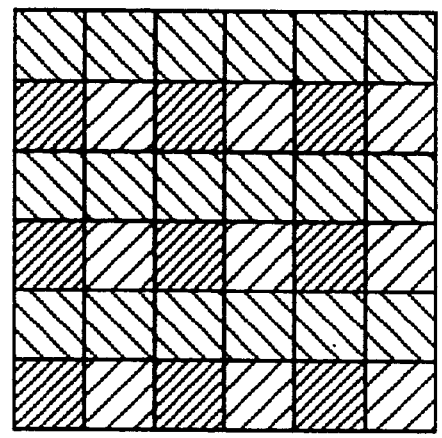
(B)
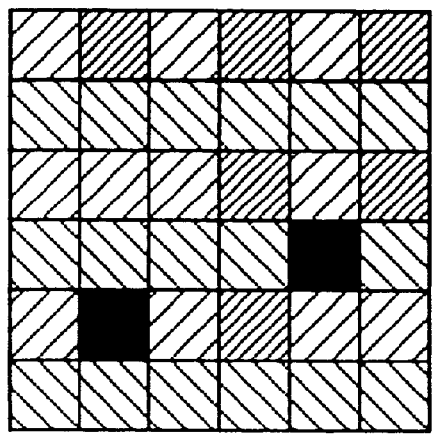
(C)
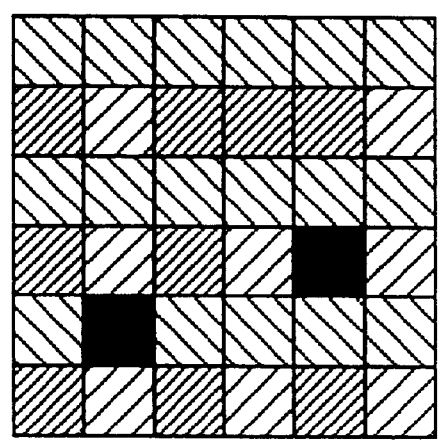
(D)
Fig. 10

METHOD AND APPARATUS FOR ELECTRICAL TEST OF CMOS PIXEL SENSOR ARRAYS

FIELD OF THE INVENTION

The present invention relates to a method and apparatus for electrical testing of CMOS pixel sensor arrays. In particular, the present invention relates to electrical testing for detecting adjacent cell shorts or stuck-at faults (i.e., a condition where a fixed output is generated regardless of the input) as well as verification of read-channel circuit functionality and performance.

BACKGROUND OF THE INVENTION

CMOS pixel sensors (herein CMOS PS) have been of interest as replacements for charge coupled devices (herein CCD) in imaging applications. CMOS PS promise lower power and simpler system level design through fewer power supply voltages and higher functional integration. These factors contribute to lowering system cost while providing for a potential "camera on a chip". Such features are highly desirable, for example, in camcorders or digital cameras where the devices may be reduced to a size of a TV remote control while allowing high resolution color images to be recorded for hours. Further, while CCD imagers impose rigid processing constraints such as buried channels to achieve high transfer efficiency and are serially accessed, CMOS PS imagers, on the other hand, utilize conventional CMOS circuitry and are randomly accessed. This random access is provided by access transistors within each pixel and eliminates the need for a high transfer efficiency which is required for devices which are serially accessed.

When testing for functionality and performance, due to their serial nature, CCD imagers can be tested by shifting known charge levels towards a chain of serial shift registers and measuring the output at the end. A constant light background verifies proper photo response. On the other hand, such testing is problematic for a CMOS PS array due to its random access and non-charge conserving nature.

One method to perform such testing involves an optical test to determine the functionality of the electrical circuitry of a CMOS PS array. However, this requires a highly complicated testing method using high resolution optical patterns. Further, it is difficult, time consuming and cost-ineffective to utilize such high resolution images to test a CMOS PS array, for example, in an environment such as production. Moreover, it is not practical to have VLSI testers recognizing or performing statistics on an image field with high throughput. Therefore, what is needed is a simple, fast and cost effective method of testing, in particular, an electrical testing of CMOS PS arrays for adjacent cell shorts or stuck-at faults as well as verification of read-channel circuit functionality and performance.

SUMMARY OF THE INVENTION

The present invention relates to a method and apparatus for electrical testing of CMOS pixel sensor arrays. A plurality of pixel sensors are connected alternatively to receive signals. Output signals are generated from the pixel sensors corresponding to signals received by the pixel sensors.

BRIEF DESCRIPTION OF THE DRAWINGS

FIG. 2 illustrates a timing diagram of the basic CMOS active pixel sensor cell illustrated in FIG. 1b.

FIG. 3 illustrates an embodiment of the present invention.

FIG. 4 illustrates a system for testing a testable pixel sensor array.

FIGS. 5a–d illustrate the bar patterns produced by the embodiment in FIG. 3.

FIGS. 10a–d illustrate the quasi-checkerboard patterns produced by the embodiment in FIG. 8.

DETAILED DESCRIPTION OF THE INVENTION

In the description of the invention which follows, an exemplary 4×4 CMOS active pixel sensor (herein APS) array is chosen to illustrate the invention and to provide a thorough understanding of the present invention. However, it will be understood by one skilled in the art from reading the disclosure that the invention may be practiced with any size or type of active or passive sensor pixel arrays. An active pixel sensor actively drives the bit line with an output amplifier while a passive pixel sensor relies on charge sharing from a light sensing diode for readout. Further, the circuits illustrated in the figures are for the purposes of explanation only and by no means, limit the boundaries of the present invention. Moreover, only components necessary for thorough understanding of the invention have been illustrated and described.

Figure 1A:
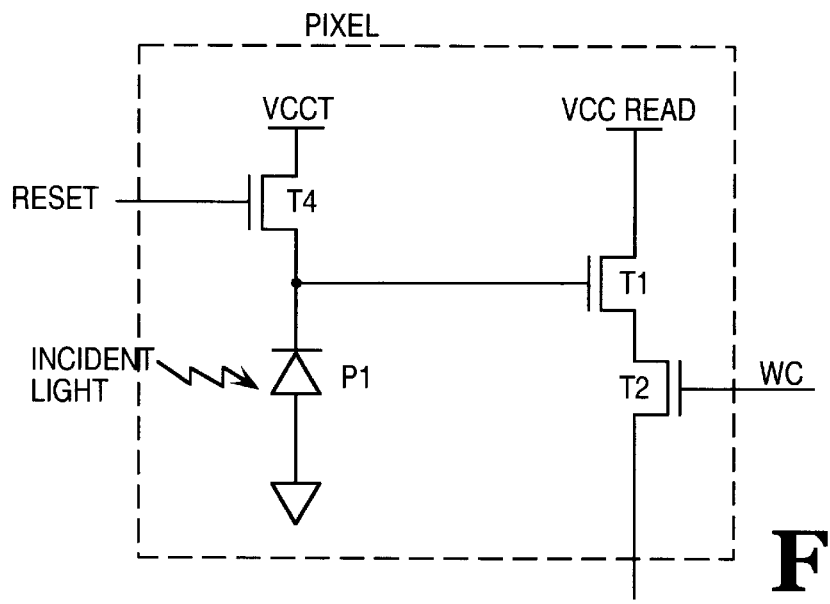
FIGS. 1a and 1b illustrate a basic testable CMOS active pixel sensor cell.
Figure 1B:
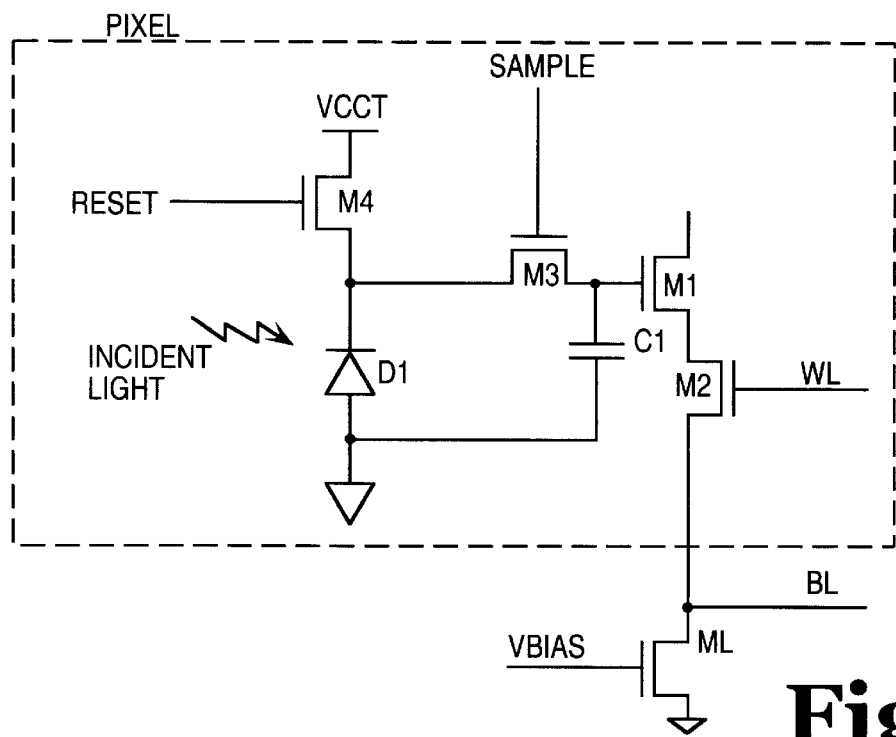

FIGS. 1a and 1b illustrate an example of a basic testable APS pixel. The operation of the testable APS pixel is herein described to aid in the understanding of the invention to be illustrated and described. FIG. 1a illustrates an example of an APS pixel that does not use a sampling transistor. In this instance, the voltage reading across the Photodiode P1 is directly read out by transistors T1 and T2. Referring to FIG. 1b, transistor M4 is used to precharge the photodiode D1 to reset power (herein $V_{CCT}$). Incident light falling on the photodiode D1 generates electron-hole pairs and the electrons are collected by a N type well, driving the diode D1 to a lower voltage. This voltage is a function of the light intensity and the time since precharge, commonly referred to as the integration time. Sampling transistor M3 and storage capacitor C1 provide the "electronic shutter", that is, when the deassertion of the SAMPLE signal is applied to transistor M3, the storage capacitor C1 is isolated from the photodiode D1, capturing the instant analog voltage across the photodiode D1. The storage capacitor C1 can be implemented with a transistor having the source and the drain connected together. Transistor M2 is the access device and transistor M1 comprises the top of a source-follower. The load device ML is common to each bit line.

FIG. 2 illustrates a timing diagram that further aids in the explanation of the operation of the basic APS pixel in FIG. 1b. Initially, RESET is asserted on transistor M4, precharging the photodiode D1 to approximately $V_{CCT}$. SAMPLE is asserted simultaneously with RESET allowing the storage capacitor C1 to precharge to the same voltage level as the photodiode D1. Here, it is assumed that the SAMPLE and RESET signal high levels are overdriven to avoid threshold voltage $V_T$ drop across transistors M3 and M4. Integration begins with the deassertion of the RESET turning off transistor M4 and allowing the incident light falling on the photodiode D1 to dictate the voltage drop across the photodiode D1. Since SAMPLE is still asserted, the voltage drop of the storage capacitor C1 corresponds to the voltage drop across the photodiode D1. With the deassertion of SAMPLE, thereby, turning off transistor M3, storage capacitor C1 is isolated from the photodiode D1 capturing the instant voltage drop across photodiode D1. Readout in the normal manner is performed on a row by row basis by asserting the Wordline WL which turns on transistor M2 allowing the voltage drop across the storage capacitor C1 to be asserted across the load device ML and driving the Bitline BL on each pixel in the row.

FIG. 3 illustrates an exemplary embodiment of the present invention utilizing two power signals. The pixel of FIG. 1 is depicted as a block, for example, I1 to I16. Here, instead of the incident light falling on the photodiode D1 of the pixel (see FIG. 1) to dictate the voltage drop across the capacitor C1, an electrical signal is applied to the $V_{CCT}$ pin of the pixel, in conjunction with other signals, to dictate the voltage drop across the capacitor C1 thereby simulating the incident light. In other words, an electrical pattern is used to test the pixels instead of an optical pattern as discussed previously. In all the exemplary embodiments illustrated, although the invention may be practiced under any lighting conditions, it is preferable to practice the invention under dark room conditions. In this example, the CMOS APS array 31 is divided into columns C32, C34, C36 and C38 respectively, and two power signals, designated $V_{cct}$ even (herein $V_{ccte}$) and $V_{cct}$ odd (herein $V_{ccto}$), are supplied to the array 31. As shown in the figure, $V_{CCT}$ of the pixels within the columns are connected serially and columns of the pixels are connected alternatively, that is, interleaved between $V_{ccte}$ and $V_{ccto}$.

A generator 32 generates a voltage value of $V_{ccte}$ and $V_{ccto}$ such that the values are different and drives the pixels in each column corresponding to $V_{ccte}$ and $V_{ccto}$. A global sample signal asserted on sample 0, sample 1, sample 2, sample 3 and a global reset signal asserted on reset 0, reset 1, reset 2, reset 3 activate the pixels in the array to read the respective values of $V_{ccte}$ and $V_{ccto}$ into the respective capacitors C1. Since the columns of pixels are connected alternatively between $V_{ccte}$ and $V_{ccto}$ and the values of $V_{ccte}$ and $V_{ccto}$ are different, a bar pattern is electrically written into the capacitors of the array 31. When the global sample signal and global reset signal are deasserted, the bar pattern is stored in array 31. The bar pattern is read out in a normal manner through the bitlines bl0, bl1, bl2 and bl3 respectively, row by row which is displayed on a display device 43 as depicted in FIG. 4. The procedure described above may be repeated using different values of $V_{ccte}$ and $V_{ccto}$ or the values of $V_{ccte}$ and $V_{ccto}$ may be switched. By comparing one or more of the readout patterns with the patterns that were written in, adjacent pixel shorts and stuck-at faults between columns are detected as well as verification of read-channel circuit functionality and performance as will be explained in FIG. 5. It is appreciated that the exemplary embodiment of FIG. 3 may be practiced in a CMOS APS array void of sampling transistors. In this instance, a global reset asserted on reset 0, reset 1, reset 2, reset 3 causes $V_{ccte}$ and $V_{ccto}$ to electrically write a bar pattern into the entire array. The pattern is available at the outputs of the array which read out in a normal manner through the bitlines bl0, bl1, bl2 and bl3 respectively, row by row and displayed.

FIGS. 5a and 5b illustrate the bar patterns discussed above. Referring to FIG. 5a, the first, third and fifth columns reflect a bar pattern corresponding to the voltage value of $V_{ccte}$ and the second, fourth and sixth columns reflect a bar pattern corresponding to the voltage value of $V_{ccto}$. In this instance, a bar pattern is electrically written in as discussed previously and a bar pattern is read out, for example, by a display circuitry 42 (see FIG. 4) and a display device 43 such as a monitor that indicates no adjacent shorts or stuck-at faults exist in the CMOS APS array. In contrast, FIGS. 5c and 5d illustrate output bar patterns that display adjacent shorts and stuck-at faults. For example, the pixel in column two, row three displays an adjacent short. The pixel in column five, row four displays a stuck-at fault. The read out of the bar patterns in the normal manner verifies read-channel circuit functionality and performance.

Figure 6:
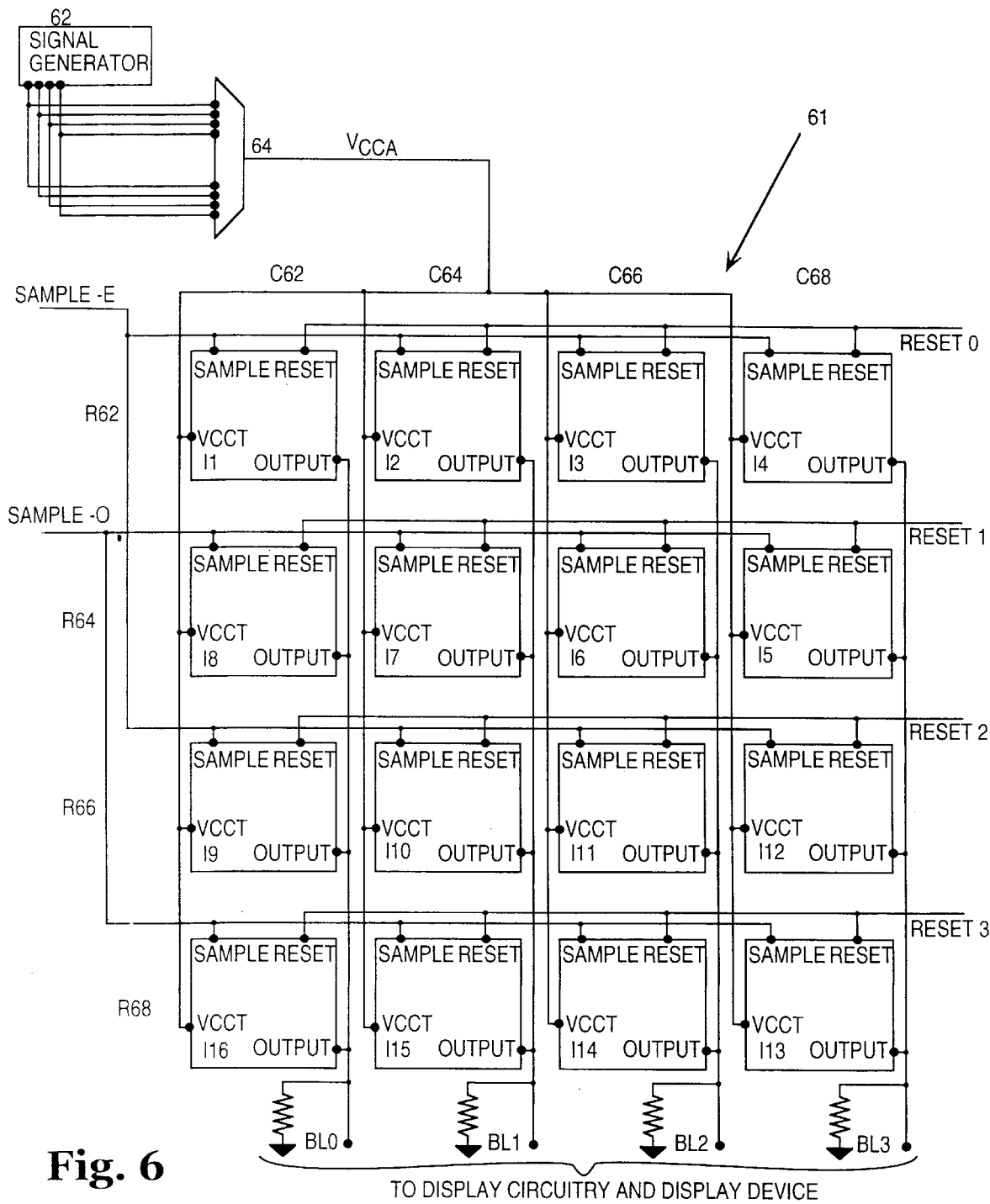
FIG. 6 illustrates another embodiment of the present invention.

FIG. 6 illustrates an exemplary embodiment of the present invention utilizing three power signals, one of which is variable. In this example, CMOS APS array 61 is divided into rows R62, R64, R66 and R68 respectively, and the variable power signal (herein $V_{CCA}$) is supplied to the $V_{CCT}$ pin of all pixels in the array. As shown in the figure, SAMPLE pin of the pixels within the rows are connected serially and rows of the pixels are connected alternatively, that is, interleaved between the other two power signals sample even (herein sample-e) and sample odd (herein sample-o). A generator 62 generates a variable value of $V_{CCA}$ relative to the duration of sample-e and sample-o signals such that when one of sample-e or sample-o signal terminates, the value of $V_{CCA}$ varies to a new value. This aspect is described further with respect to FIG. 7. Further, designing a circuitry to vary $V_{CCA}$ with respect to the duration of sample-e and sample-o signals is within the knowledge of one skilled in the art and is not described in detail here. A global reset asserted on reset 0, reset 1, reset 2, reset 3 causes sample-e and sample-o to electrically write a bar pattern into the entire array 61. When the global reset is deasserted, the bar pattern is stored in array 61 by the individual storage capacitors within the pixels. The bar pattern is read out in a normal manner through the bitlines bl0, bl1, bl2 and bl3 respectively, row by row and displayed. The procedure above may be repeated using different values of varying $V_{CCA}$.

Figure 7:
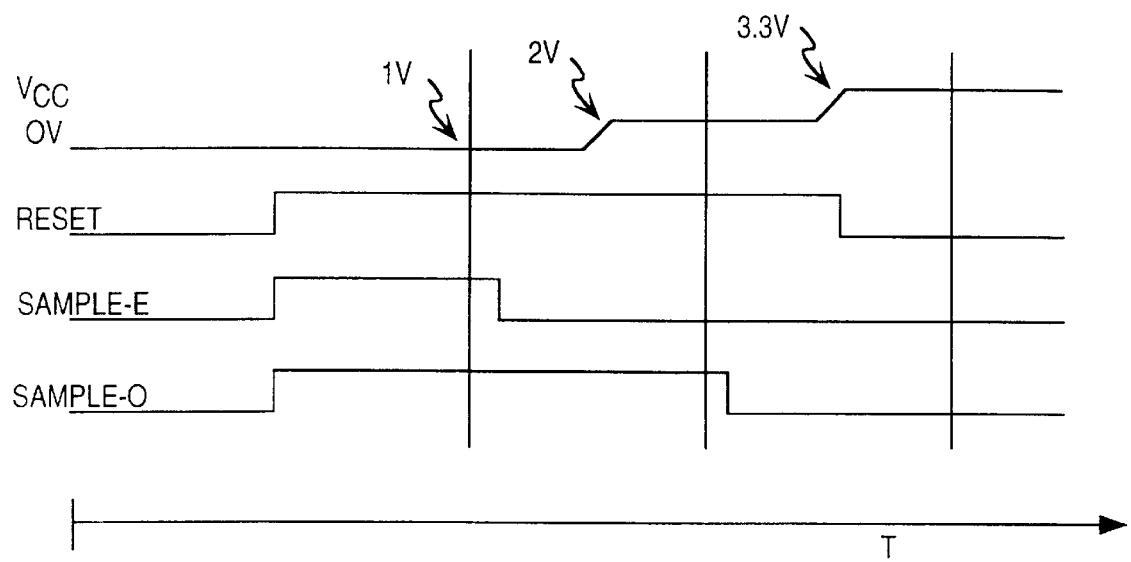
FIG. 7 illustrates a timing diagram of the operation of the embodiment in FIG. 6.

FIG. 7 illustrates a timing diagram that further aids in the explanation of operation of exemplary embodiment in FIG. 6. Assuming the varying power signal $V_{CCA}$ varies from 1V to 2V and then to readout voltage 3.3V, initially, a global reset is asserted to RESET pin of the pixel in the entire array. Both power signals sample-e and sample-o are asserted to the array causing the storage capacitors in the pixels to charge to initial $V_{CCA}$, that is 1V. After a short settling time, sample-e signal is deasserted causing the pixels connected to sample-e signal to store 1V. $V_{CCA}$ is then varied to 2V causing the remaining pixels connected to sample-o signal to charge to 2V. After a short settling time, sample-o signal is deasserted causing the pixels connected to sample-o signal to store 2V. From the above procedure, a bar pattern is stored in the pixel array. Global reset is deasserted and $V_{CCA}$ is varied to readout voltage 3.3V. The bar pattern is then read out in a normal manner through the bitlines bl0, bl1, bl2 and bl3 respectively, row by row and displayed.

Figure 8:
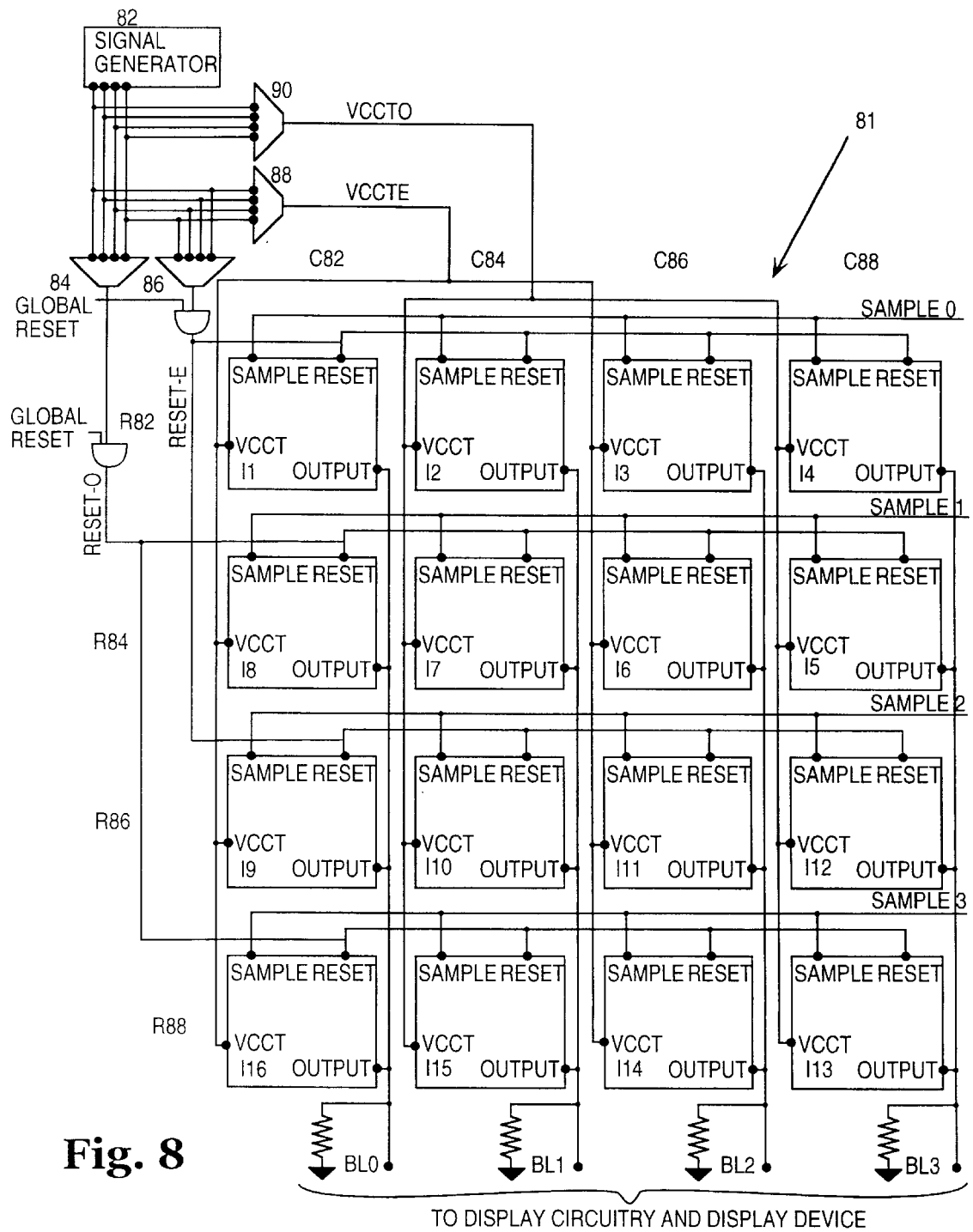
FIG. 8 illustrates another embodiment of the invention.

FIG. 8 illustrates another embodiment of the present invention. In this example, four power signals, $V_{ccte}$, $V_{ccto}$, Reset even (herein Resete) and Reset odd (herein Reseto) are used to electrically test the CMOS APS array 81 depicted in the figure. Array 81 is divided into columns, C82, C84, C86 and C88, and is further divided into rows R82, R84, R86 and R88. As shown in the figure, $V_{CCT}$ pin of the pixels within the columns are connected serially and the columns of pixels are connected alternatively, that is, interleaved between the $V_{ccte}$ and $V_{ccto}$. RESET pin of the pixels within the rows are connected serially and the rows of pixels are interleaved between Resete and Reseto. A generator 82 generates a plurality of power signals that is supplied to the multiplexors 84, 86, 88, 90. Multiplexors 84, 86, 88, 90 select a value of Reseto, Resete, $V_{ccte}$ and $V_{ccto}$ to drive the pixels in the array 81. A global sample asserted on sample 0, sample 1, sample 2, sample 3 and a global reset asserted on reset 0, reset 1, reset 2, reset 3 cause Reseto, Resete, $V_{ccte}$ and $V_{ccto}$ to electrically write a quasi-checkerboard pattern into the array 81. The creation of the quasi-checkerboard pattern is further discussed with respect to FIGS. 9 and 10. In a normal manner, after a short settling time, the global reset and global sample signals are deasserted and the quasi-checkerboard pattern is stored in the array 81. The quasi-checkerboard pattern is then read out of the array 81 in a normal manner through the bitlines bl0, bl1, bl2 and bl3 respectively, row by row and displayed.

New values of Reseto, Resete, $V_{ccte}$ and $V_{ccto}$ may be selected by the multiplexors 84, 86, 88, 90 or the original values of Reseto and Resete switched by multiplexors 84, 86 and the original values of $V_{ccte}$ and $V_{ccto}$ switched by multiplexors 88, 90 respectively. The new power signals are supplied to the array to electrically write another quasi-checkerboard pattern image which is stored and then read out in the manner mentioned above. By writing, reading out and comparing the quasi-checkerboard pattern with the pattern that was written in and further, by using one or more quasi-checker board patterns read out, adjacent pixel shorts and stuck-at faults between columns are detected as well as verification of read-channel circuit functionality and performance for the entire array.

Figure 9:
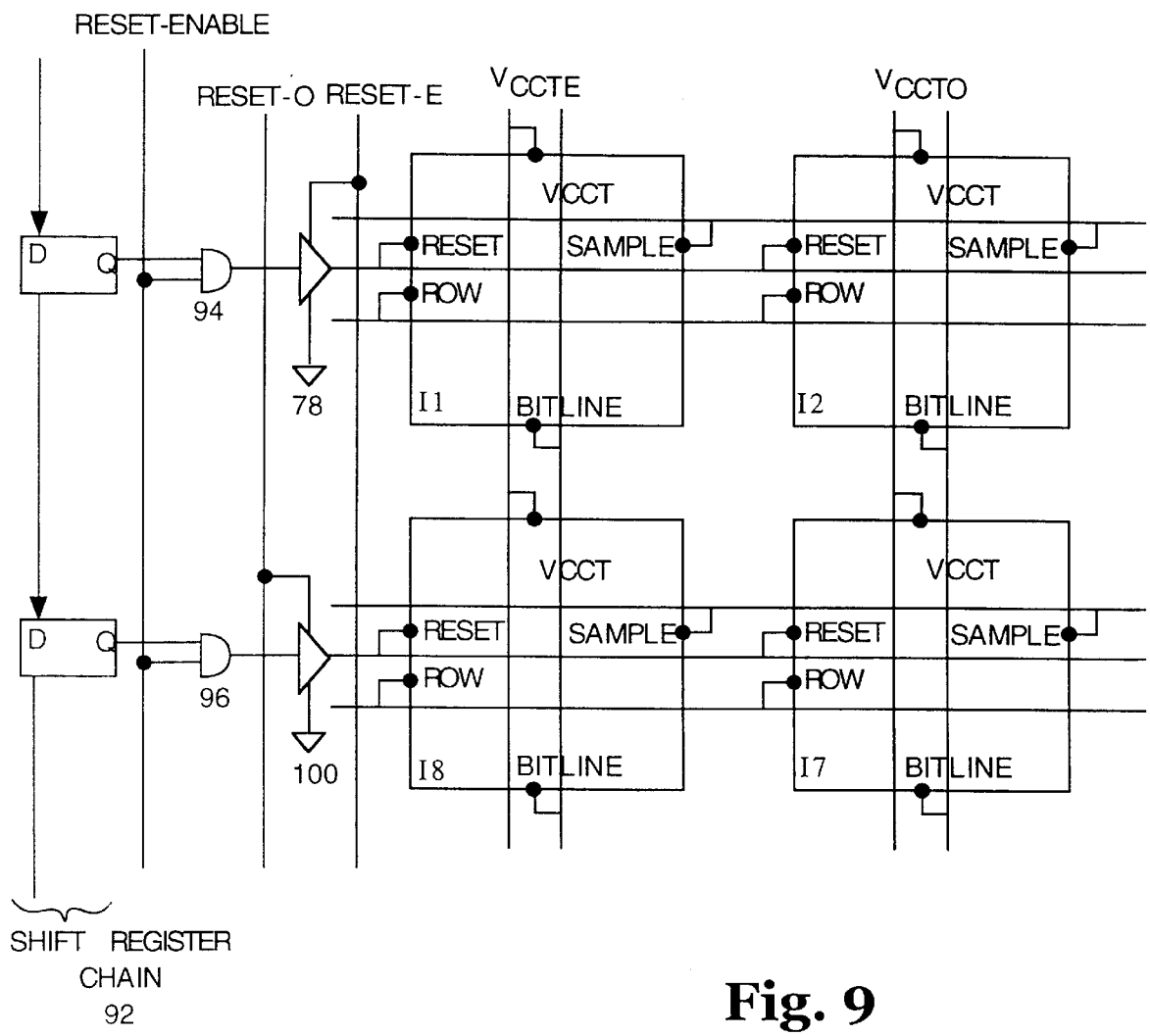
FIG. 9 shows in more detailed the embodiment in FIG. 8.

FIG. 9 provides a more detailed explanation of the apparatus described with respect to FIG. 8. In this example, only the pixels I1, I2, I8 and I7 are illustrated. Further, the threshold voltage $V_{tn}$ across the precharge transistor M4 (see FIG. 1b) is taken into consideration. $V_{CCT}$ of the pixels within the columns are connected serially and the columns of pixels are connected alternatively, that is, interleaved between $V_{ccte}$ and $V_{ccto}$. The RESET of the pixels within the rows are connected serially and the rows of pixels are interleaved between Resete and Reseto. Following the application of the power signals $V_{ccte}$, $V_{ccto}$, Resete and Reseto, the pixels in the array write a quasi-checkerboard pattern into the storage capacitors C1 according to the following formula:

For $V_{reset} - V_{tn} > V_{cct}$, the cell diode, thus the stored signal, is $V_{cct}$.

For $V_{reset} - V_{tn} < V_{cct}$, the cell diode, thus the stored signal, is $V_{reset} - V_{tn}$.

For example, assuming $V_{ccte}$, $V_{ccto}$, Reste and Reseto are assigned values 3.3V, 2.8V, 4.3V and 2.5V respectively, and further assuming that $V_{tn}$ equals 0.5V, referring to the figure and the formula above, I1, I2, I8 and I7 will be written 3.3V, 2.8V, 2.0V and 2.0V respectively. Applying this to the remaining pixels in the array 81 a quasi-checkerboard pattern is formed when the values are represented by shades of gray or color in a display device. By subsequent switching of values between $V_{ccte}$ and $V_{ccto}$, Reste and Reseto respectively, another quasi-checkerboard pattern is formed in a similar manner. Furthermore, it is appreciated that the exemplary embodiment of FIG. 8 may be practiced in a CMOS APS array void of sampling transistors in the manner described in FIG. 3. In addition, during normal operation the shift register chain 92 operates the resets on a row by row basis. However, during the test mode, all resets are asserted, simultaneously, by filling the shift register with logical '1's. It should be noted that the actual implementation requires further combinational logic, for example, a decoder augmented by some extra logic, however, is not shown in the figure for clarity in describing the testability features.

FIGS. 10 illustrate the quasi-checkerboard patterns discussed above. Referring to FIG. 10a, the columns of the array display a checker pattern indicating that there are no adjacent pixel shorts within the column. The first, third and fifth rows display a checker pattern also indicating that there are no adjacent shorts. The bar pattern in second, fourth and sixth rows displaying $V_{reset}$ indicates that there are no stuck-at faults. Further, the read out of the quasi-checker board pattern in the normal manner verifies read-channel circuit functionality and performance. Similarly, referring to FIG. 10b, the second, fourth and sixth rows indicate there are no adjacent shorts. The bar pattern in first, third and fifth rows displaying $V_{reset}$ indicates that there is no stuck-at faults. In contrast FIGS. 10c and 10d illustrate output quasi-checkerboard patterns that display adjacent shorts and stuck-at faults. For example, the pixel in column two, row three displays an adjacent short. The pixel in column five, row four displays a stuck-at fault. Thus, by writing, reading out and comparing the quasi-checkerboard pattern or patterns with the pattern or patterns that was written in and further, by using one or more quasi-checker board patterns that were read out, adjacent pixel shorts and stuck-at faults are detected as well as verification of read-channel circuit functionality and performance for the entire array.

Figure 11:
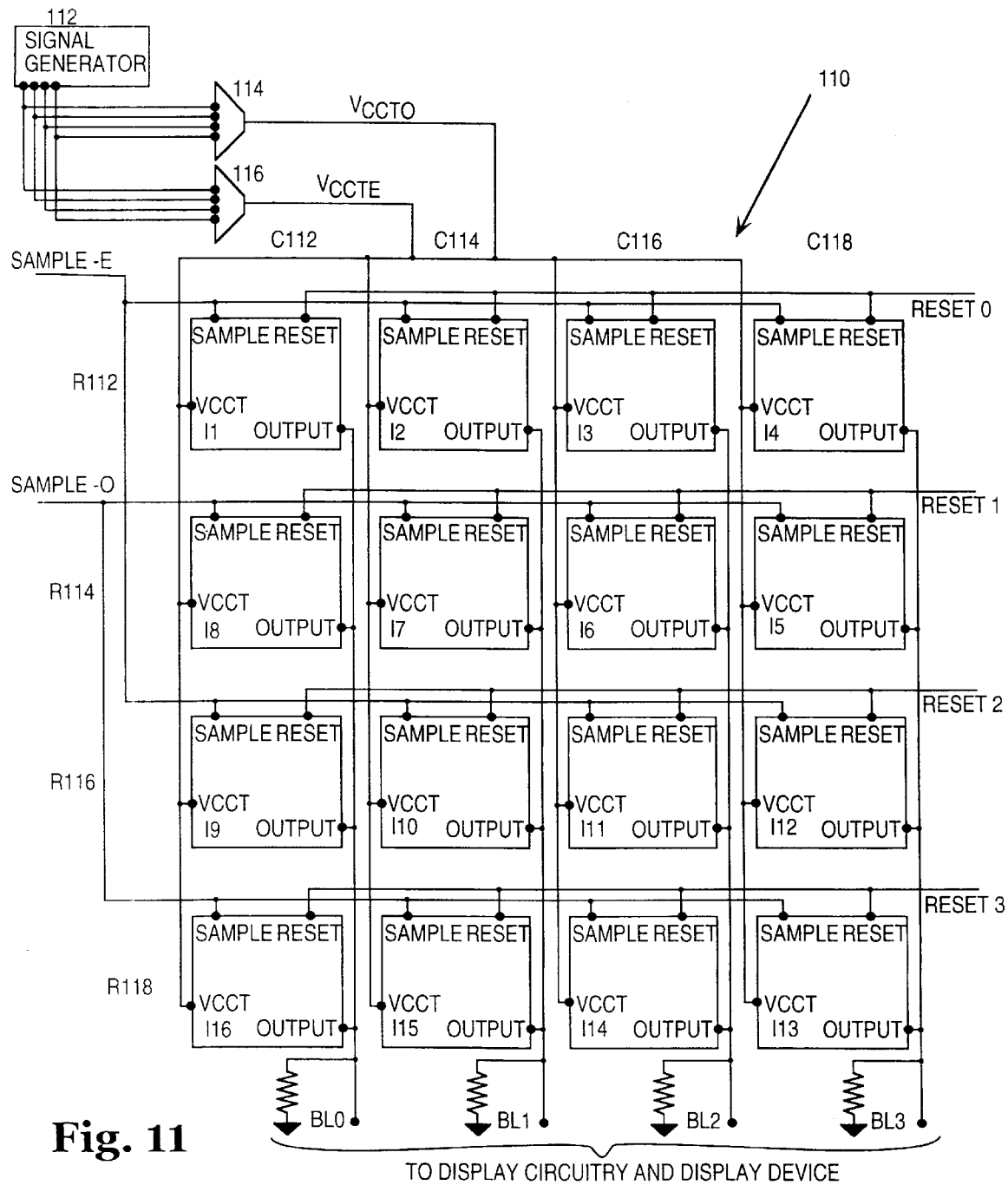
FIG. 11 illustrates another embodiment of the invention.

FIG. 11 illustrates another exemplary means of implementing the present invention. In this example, four power signals, two variable power signals, $V_{ccte}$ and $V_{ccto}$, and two power signals of different time duration, sample-e and sample-o, are used to electrically test the CMOS APS array 110 depicted in the figure. The array 110 is divided into columns, C112, C114, C116 and C118, and is further divided into rows R112, R114, R116 and R118. As shown in the figure, the $V_{CCT}$ pin of the pixels within the columns are connected serially and the columns of pixels are connected alternatively, that is, interleaved between $V_{ccte}$ and $V_{ccto}$. SAMPLE pin of the pixels within the rows are connected serially and the rows of pixels are interleaved between sample-e signal and sample-o signal. A generator 112 generates a plurality of power signals that is supplied to the multiplexors 114, 116. Multiplexors 114, 116 select a value of $V_{ccte}$ and $V_{ccto}$ to drive the pixels in the array 110. The value of $V_{ccte}$ and $V_{ccto}$ is relative to the duration of sample-e and sample-o signals such that when one of the sample-e or sample-o signals terminate, the multiplexors 114, 116 cause new values of $V_{ccte}$ and $V_{ccto}$ to be generated. The relationship is further described in FIG. 12. A global reset asserted on reset 0, reset 1, reset 2, reset 3 causes sample-e, sample-o, $V_{ccte}$ and $V_{ccto}$ to electrically write a quasi-checkerboard pattern into the array 110. When the global reset is deasserted, the quasi-checkerboard pattern is stored in array 110. The array is read out in a normal manner through the bitlines bl0, bl1, bl2 and bl3 respectively, row by row and displayed. The procedure described above may be repeated using different values of varying $V_{ccte}$ and $V_{ccto}$. Referring to FIGS. 6, 8 and 11, it should be noted that the actual circuit connection must support individual assertion of the RESET and SAMPLE lines which has not been shown in the figures for clarity in describing the testability features. Further, the circuitry to vary $V_{ccte}$ and $V_{ccto}$ with respect to duration of sample-e or sample-o signal is within the knowledge of one skilled in the art and is not described here for the same reasons as mentioned immediately above.

Figure 12:
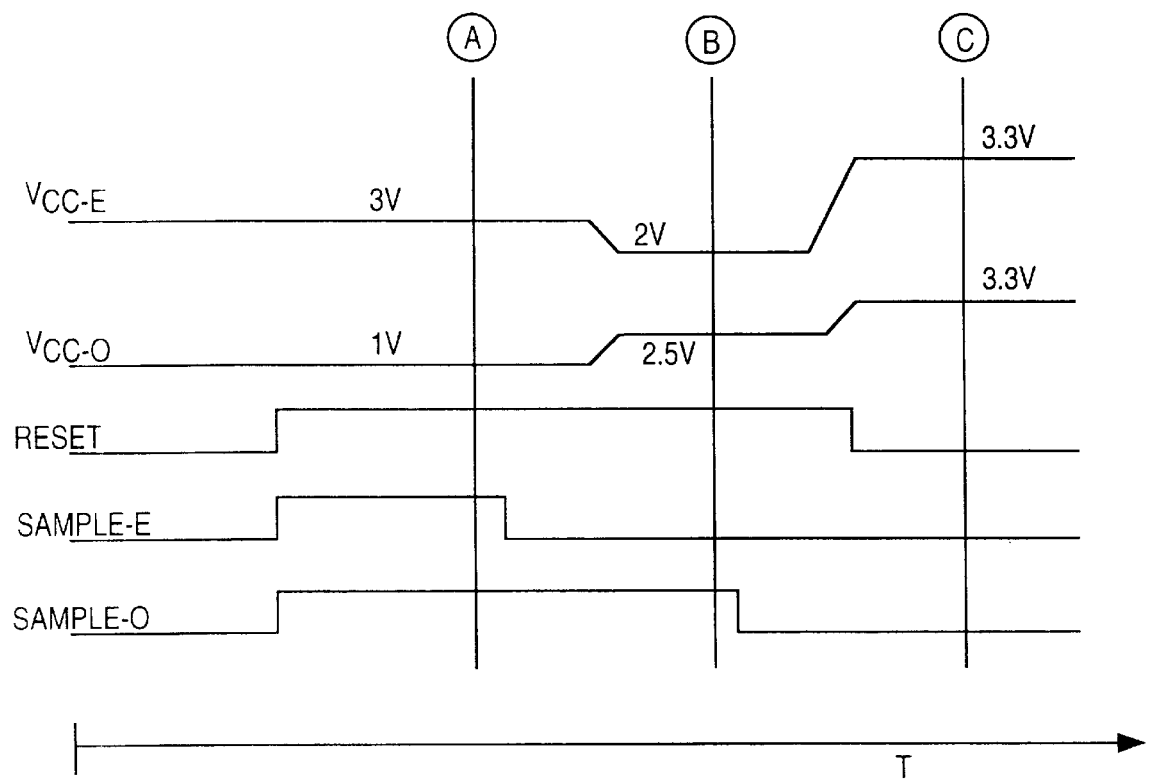
FIG. 12 illustrates a timing diagram of the operation of the embodiment in FIG. 11.

FIG. 12 illustrates a timing diagram that further aids in the explanation of operation of exemplary embodiment in FIG. 11. Assuming that the varying power signals $V_{ccte}$ varies from 3V to 2V and then to readout voltage 3.3V, and $V_{ccto}$ varies from 1V to 2.5V and then to readout voltage 3.3V, initially, a global reset is asserted to RESET pin of the pixel in the entire array. Both power signals sample-e and sample-o are asserted to the array causing the storage capacitors in the pixels connected to $V_{ccte}$ or $V_{ccto}$ to charge to 3V and 1V respectively. After a short settling time, sample-e signal is deasserted causing the pixels connected to sample-e and to $V_{ccte}$ or $V_{ccto}$ to store 3V and 1V respectively. $V_{ccte}$ and $V_{ccto}$ are then varied to 2V and 2.5V respectively causing the remaining pixels connected to sample-o signal and to $V_{ccte}$ or $V_{ccto}$ to charge to 2V and 2.5V respectively. After a short settling time, sample-o signal is deasserted causing the pixels connected to sample-o signal and $V_{ccte}$ or $V_{ccto}$ to store 2V and 2.5V respectively. From the above procedure, a checkerboard pattern is stored in the pixel array. Global reset signal is deasserted and both $V_{ccte}$ and $V_{ccto}$ are varied to readout voltage 3.3V. The array is then read out in a normal manner through the bitlines bl0, bl1, bl2 and bl3 respectively, row by row and displayed.

It will be appreciated that although an exemplary embodiments have been described in detail, one skilled in the art from reading the disclosure would understand that rows and columns are interchangeable and that the invention is not limited to rows and columns. Moreover, the generator and the multiplexors may be a single signal circuitry that generates the required power signals. Further, the generator and multiplexors or the signal circuitry could be integrated into the array allowing for a stand alone electrical testable CMOS APS array or the generator and multiplexors, or the single circuitry could be partially or totally external to the array and the power signals provided for through power pads located at the array.

Figure 13:
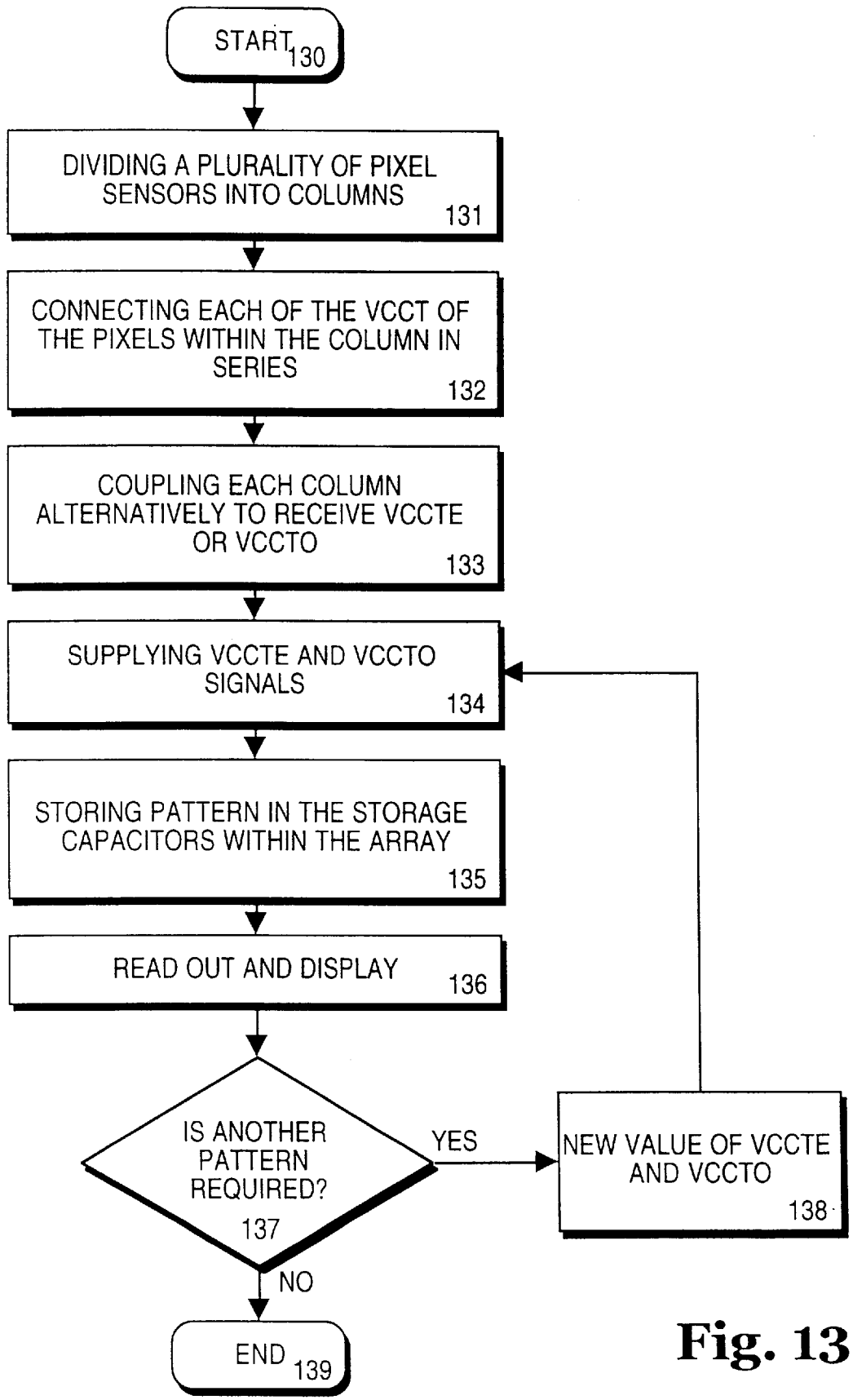
FIG. 13 illustrates a flow chart of an embodiment with two power signals.

FIG. 13 shows a flow chart of the invention using two power signals. In block 131, a CMOS PS array is divided into columns. In blocks 132 and 133, $V_{CCT}$ of the pixels within the columns are connected serially and columns of the pixels are connected alternatively between the two power signals $V_{ccte}$ and $V_{ccto}$. In block 134, $V_{ccte}$ and $V_{ccto}$ are supplied to the columns connected to receive the respective power signals. The entire array is electrically written at once by turning on the global sample enable and global reset enable signals. In block 135, once, the two global signals are turned off after a short settling time, the written pattern, in this instance, a bar pattern, is stored in the array. In block 136, the array is read out in a normal manner through the bitlines row by row and displayed. In blocks 137 and 138, the cycle is repeated to generate additional patterns. By comparing one or more of the readout patterns with the patterns that are written in, adjacent pixel shorts and stuck-at faults between columns are detected as well as verification of read-channel circuit functionality and performance.

Figure 14:
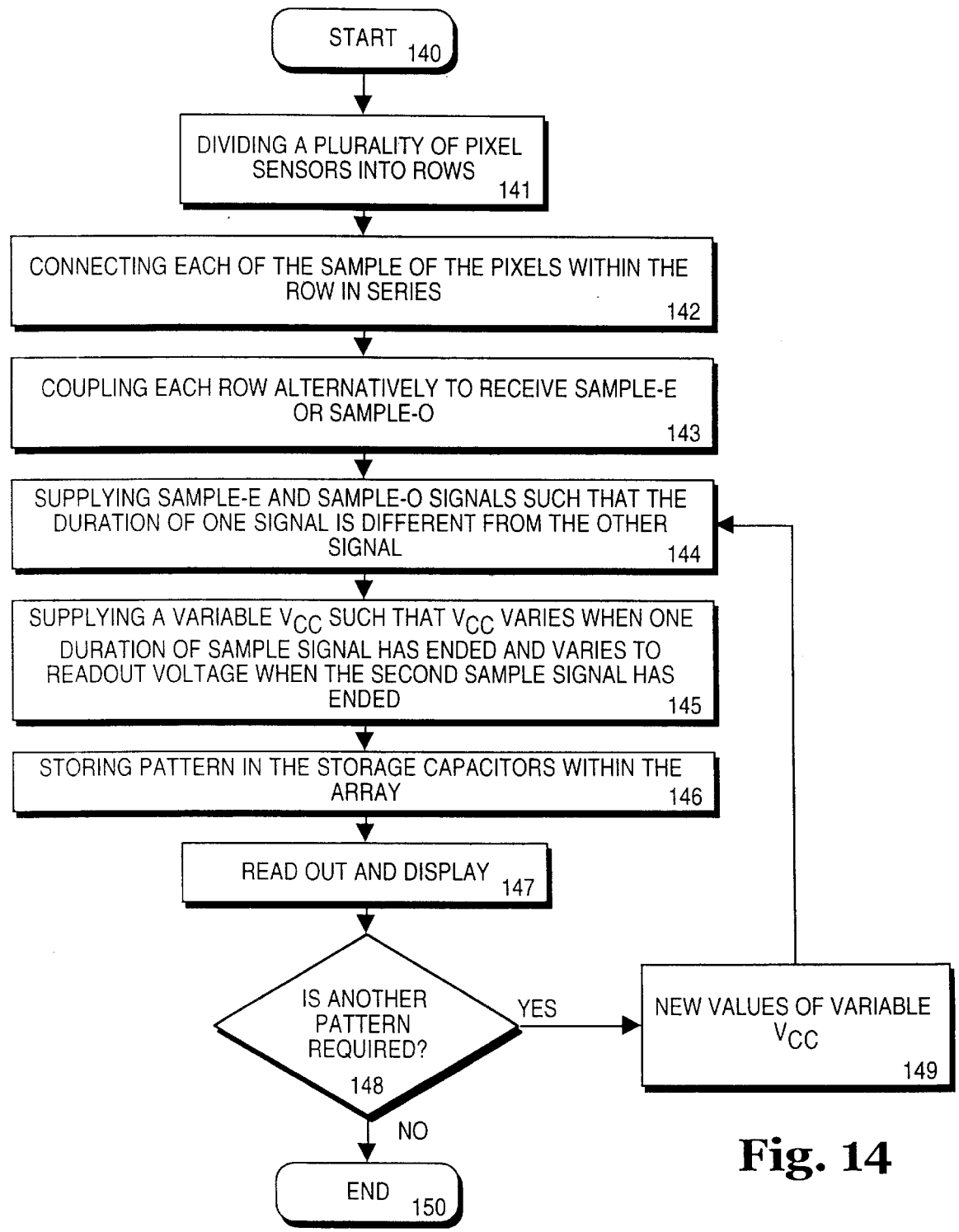
FIG. 14 illustrates a flow chart of an embodiment with three power signals one of which is variable.

FIG. 14 shows a flow chart of the invention using three power signals. In block 141, a CMOS PS array is divided into rows. In blocks 142 and 143, the SAMPLE of the pixels within the rows are connected serially and rows of the pixels are connected alternatively between the two power signals sample-e and sample-o. In block 144, sample-e and sample-o signals are supplied to the rows connected to receive the respective power signals. The duration of one sample signal is longer than the other sample signal, however, one sample signal should exceed the settling time of the pixel and the other sample signal should exceed twice the settling time of the pixel. In block 145, coincidentally, a variable $V_{cc}$ is supplied to the entire array such that when the duration of one sample signal has ended, $V_{cc}$ varies to a different value. When the duration of the second sample signal has ended, $V_{cc}$ varies again to readout voltage. The entire array is electrically written in by turning on the global reset enable signal. In block 146, once the global reset signal is turned off, a bar pattern is stored in the array. In block 147, the array is read out in a normal manner through the bitlines row by row and displayed. In blocks 148 and 149, the cycle is repeated to generate additional patterns.

Figure 15A:
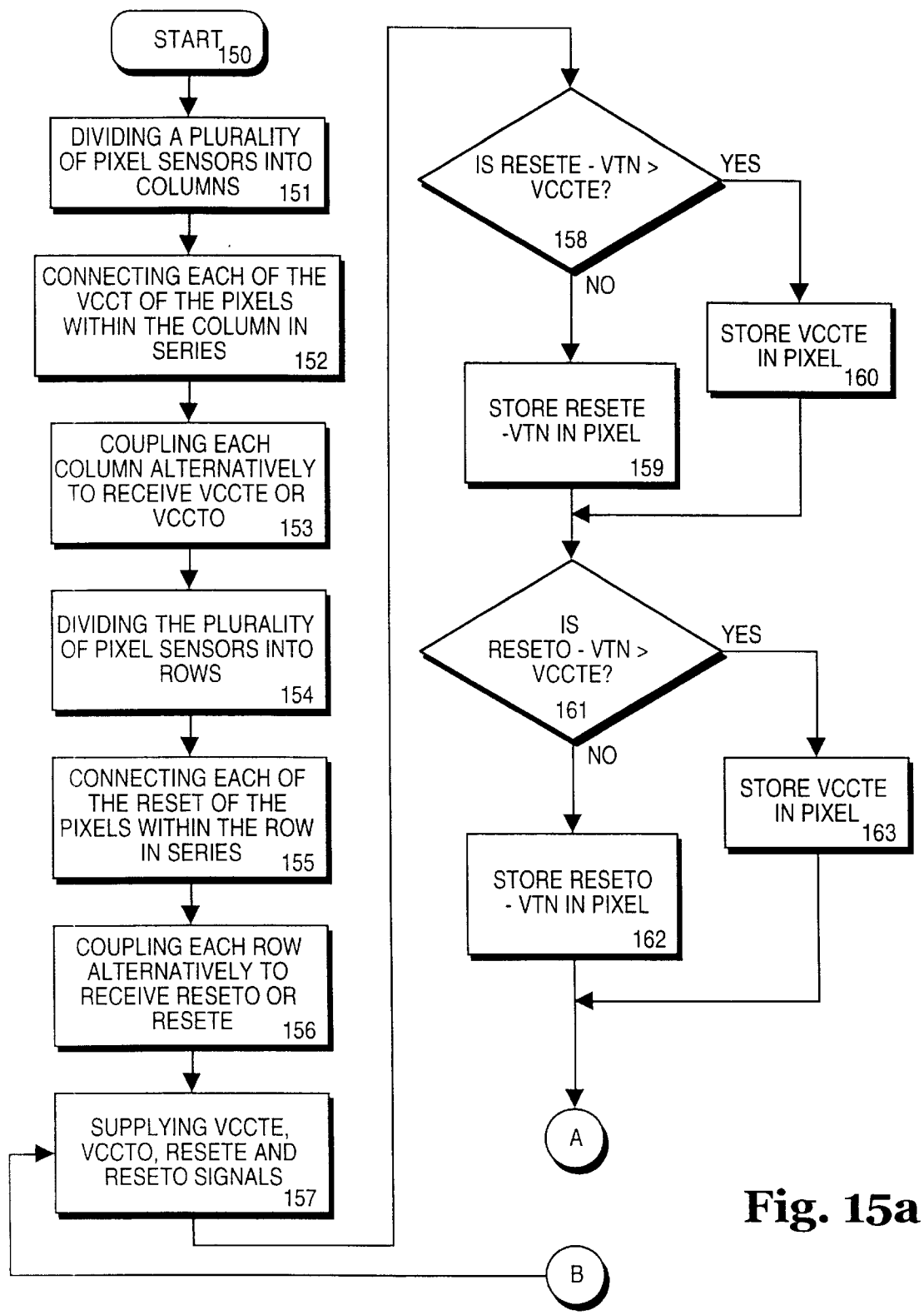
FIG. 15a and 15b illustrate a flow chart of an embodiment using four power signals.
Figure 15B:
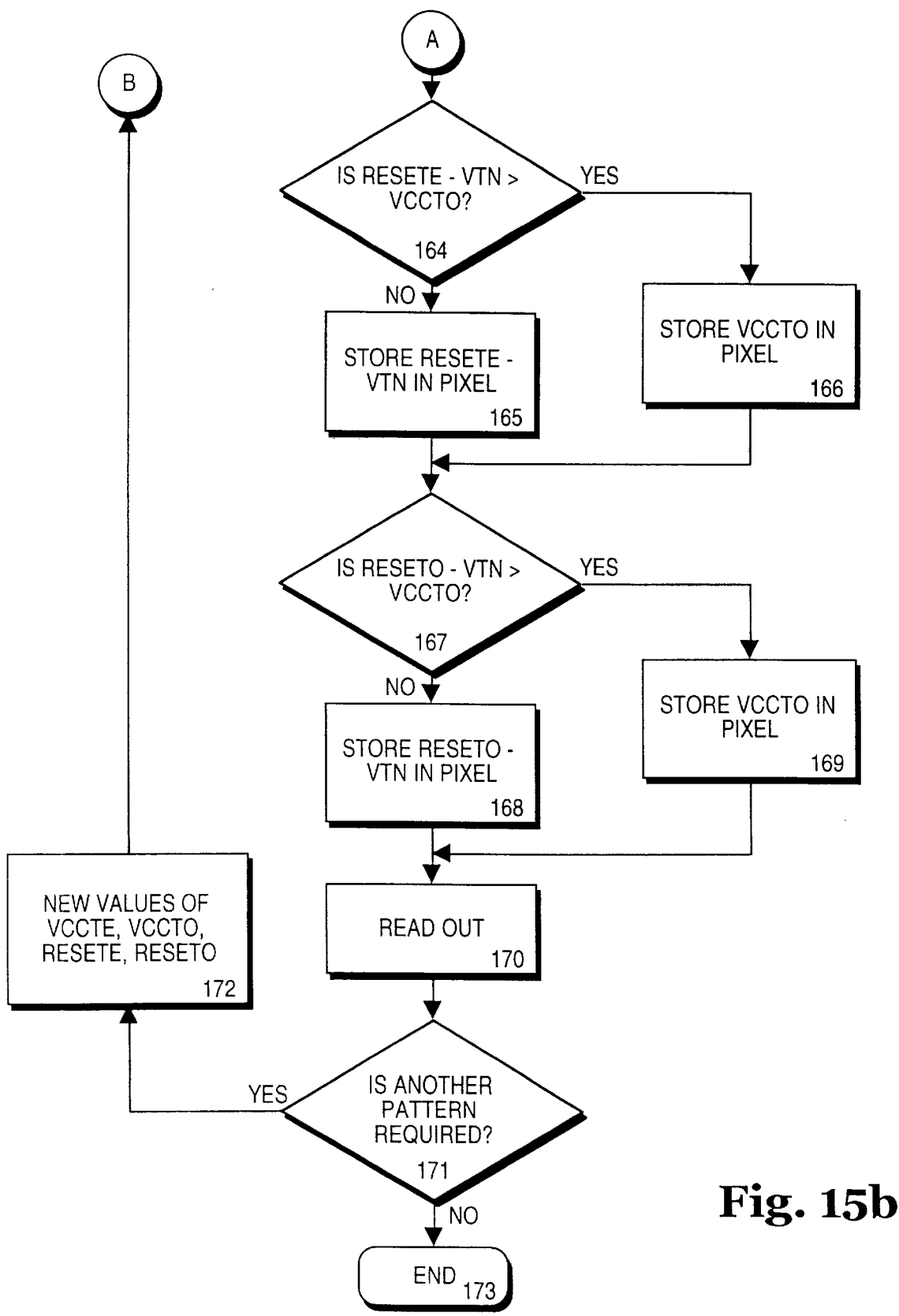

FIG. 15 shows a flow chart of the invention using four power signals. In block 151, a CMOS PS array is divided into columns. In blocks 152 and 153, $V_{CCT}$ of the pixels within the columns are connected serially and columns of the pixels are connected alternatively between two power signals $V_{ccte}$ and $V_{ccto}$. In block 154, the CMOS PS array is divided into rows. In blocks 155 and 156, the RESET of the pixels within the rows are connected serially and rows of the pixels are connected alternatively between two power signals Resete and Reseto. In block 157, $V_{ccte}$, $V_{ccto}$, Reseto and Resete signals are supplied to the columns and rows of the array connected to receive the respective signals. The entire array is electrically written at once by turning on the global sample enable and global reset enable signals. In blocks 158 to 160, actual value stored in the storage capacitor of the pixel receiving the power signals $V_{ccte}$ and Resete is dependent on the values of $V_{ccte}$ and Resete. Taking into consideration the threshold voltage $V_{tn}$ across the transistor M4 (see FIG. 1b), if Resete–$V_{tn}$ is greater than $V_{ccte}$, $V_{ccte}$ is stored in the storage capacitor, otherwise, Resete–$V_{tn}$ is stored. In blocks 161 to 163, actual value stored in the storage capacitor of the pixel receiving the power signals $V_{ccte}$ and Reseto is dependent on the values of $V_{ccte}$ and Reseto. If Reseto–$V_{tn}$ is greater than $V_{ccte}$, $V_{ccte}$ is stored in the storage capacitor, otherwise, Reseto–$V_{tn}$ is stored. In blocks 164 to 166, actual value stored in the pixel receiving the power signals $V_{ccto}$ and Resete is dependent on the values of $V_{ccto}$ and Resete. If Resete–$V_{tn}$ is greater than $V_{ccto}$, $V_{ccto}$ is stored, otherwise, Resete–$V_{tn}$ is stored. In blocks 167 to 169, actual value stored in the pixel receiving the power signals $V_{ccto}$ and Reseto is dependent on the values of $V_{ccto}$ and Reseto. If Reseto–$V_{tn}$ is greater than $V_{ccto}$, $V_{ccto}$ is stored, otherwise, Reseto–$V_{tn}$ is stored. In block 170, the array is read out in a normal manner through the bitlines row by row and displayed. In blocks 171 and 172, the cycle is repeated to generate additional patterns. By comparing one or more of the readout patterns with the patterns that are written in, adjacent pixel shorts and stuck-at faults are detected as well as verification of read-channel circuit functionality and performance for the entire array.

Figure 16:
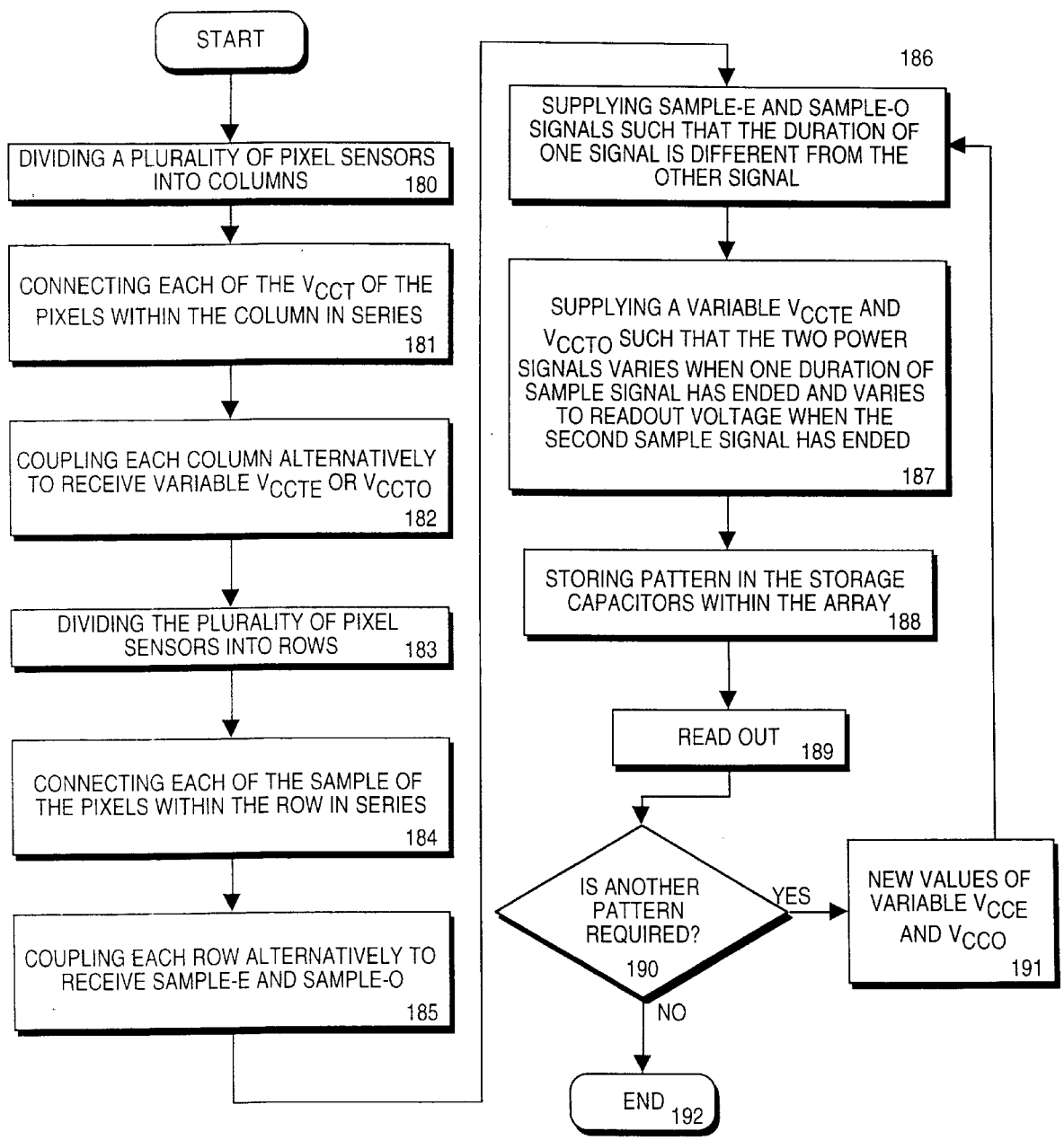
FIG. 16 illustrates a flow chart of an embodiment using four power signals two of which are variable.

FIG. 16 shows a flow chart of the invention using four power signals, two of which are variable. In block 180, a CMOS PS array is divided into columns. In blocks 181 and 182, the $V_{CCT}$ of the pixels within the columns are connected serially and columns of the pixels are connected alternatively between two power signals $V_{ccte}$ and $V_{ccto}$. In block 183, the CMOS PS array is divided into rows. In blocks 184 and 185, the SAMPLE of the pixels within the rows are connected serially and rows of the pixels are connected alternatively between two power signals sample-e and Sample-o. In block 186, sample-e and sample-o signals are supplied to the respective rows connected to receive the signals. Coincidentally, in block 187, variable $V_{CCTE}$ and $V_{CCTO}$ are supplied to the respective columns connected to receive the power signals. When the duration of one sample signal has ended, $V_{CCTE}$ and $V_{CCTO}$ varies to a different value. When the duration of the second sample signal has ended, both $V_{CCTE}$ and $V_{CCTO}$ varies to readout voltage. The entire array is electrically written in by turning on the global reset enable signal. In block 188, once, the global reset signal is turned off, a quasi-checkerboard pattern is stored in the storage capacitors of the pixels. In block 189, the array is read out in a normal manner through the bitlines row by row and displayed. In blocks 190 and 191, the cycle is repeated to generate additional patterns.

Figure 17:
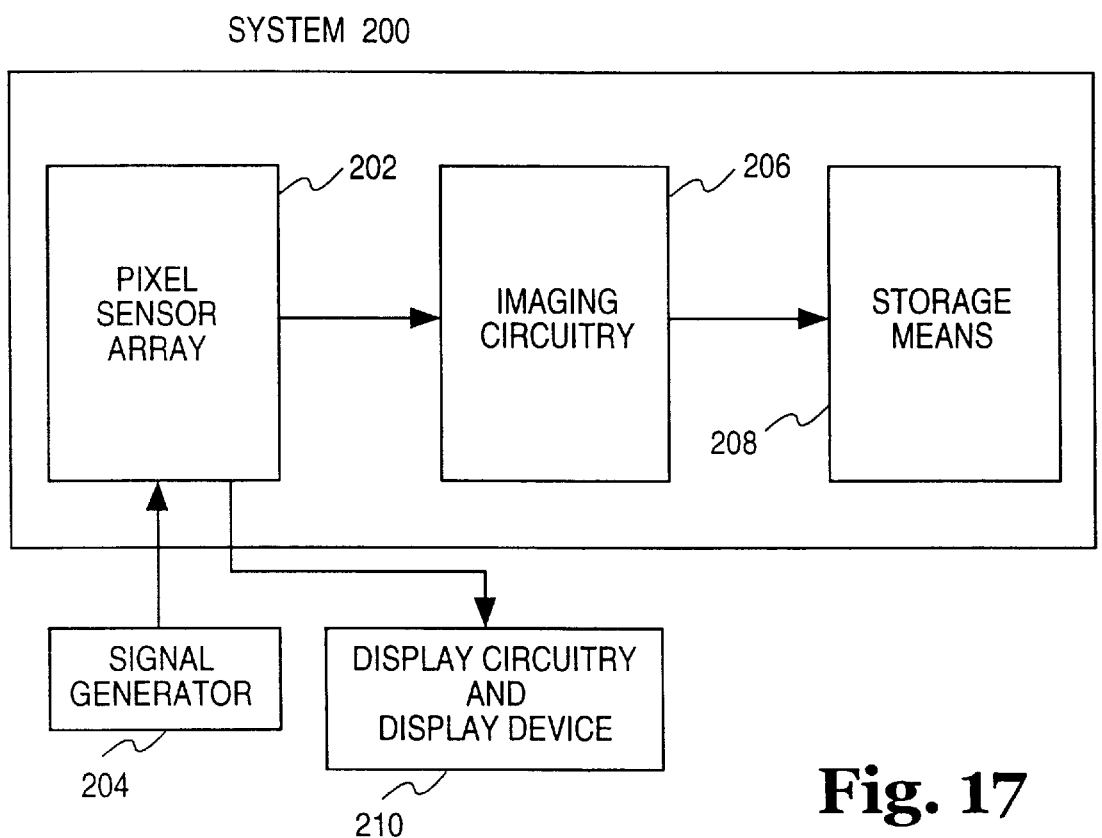
FIG. 17 illustrates a system using the present invention.

FIG. 17 illustrates a system 200 that utilizes the present invention. The system 200 may be, for example, a camcorder or a digital camera or any system that relates to image processing. As shown in the figure, a CMOS PS array 202 incorporating the present invention is coupled to a imaging circuitry 206 that is further coupled to a storage means 208. The storage means may be any media, electrical or magnetic, that is able to retain images. Further, the generator 204 may be internal or external to the system. The CMOS PS array 202 may be used for self diagnostic purposes or for testing the CMOS PS array 202 in the event of system failure. It is appreciated that one skilled in the art would realize the various applications an electrically testable CMOS PS array can be utilized in such a system.

It will also be appreciated that although specific embodiments of the invention has been described in detail by way of example, various modifications may be made without departing from the spirit and scope of the invention, which should not be limited except as by the accompanying claims.

What is claimed is:

1. An apparatus comprising:
   a plurality of pixel sensors, each pixel sensor having a first input, a second input and an output, wherein said plurality of pixel sensors are divided into columns, each first input of said pixel sensors within each of said columns being coupled in series, and each column being coupled alternatively to receive first and second signals respectively,
   said pixel sensors further divided into rows, each second input of said pixel sensors within each of said rows being coupled in series, and each row being coupled alternatively to receive a third signal and a fourth signal respectively;
   said first inputs of said pixel sensors coupled alternatively to receive a first signal and a second signal respectively; and
   said outputs of said pixel sensors generating output signals corresponding to said first and second signals received at said first inputs;
   a generator coupled to said first and second inputs of said pixel sensors to generate said first, second, third and fourth signals, wherein said generator further comprises a first, second, third and fourth multiplexor, said first multiplexor coupled to said first inputs for receiving said first signal, said second multiplexor coupled to said first inputs for receiving said second signal, said third multiplexor coupled to said second inputs for receiving said third signal and said fourth multiplexor coupled to said second inputs for receiving said fourth signal, said first, second, third and fourth multiplexors selecting said first, second, third and fourth signals from a plurality of signals generated by said generator; and a display arrangement.

2. The apparatus in claim 1, wherein the display arrangement further comprises
   a display circuitry and a display device coupled to said outputs to display a pattern according to said output signals.

3. The apparatus of claim 2, wherein said first signal having a shorter duration than said second signal, said third and fourth signals changing in value when said first signal has terminated.

4. The apparatus in claim 3, wherein said pattern is a bar pattern.

5. The apparatus in claim 3, wherein said pattern is a quasi-checkerboard pattern.

6. A method comprising:
   coupling first inputs of a plurality of pixel sensors alternatively to receive a first signal and a second signal respectively;
   coupling second inputs of said plurality of pixel sensors alternatively to receive a third signal and a fourth signal respectively;
   dividing said plurality of pixel sensors into columns;
   coupling each first input of said pixel sensors within each of said columns in series;
   coupling each column alternatively to receive said first and second signals respectively;
   supplying a first signal to said first inputs of said pixel sensors coupled to receive said first signal;
   dividing said plurality of pixel sensors into rows;
   coupling each second input of said pixel sensors within each of said rows in series;
   coupling each row alternatively to receive a third signal and a fourth signal respectively;
   supplying a second signal to said first inputs of said pixel sensors coupled to receive said second signal, wherein said second signal has a value different from said first signal;
   supplying a third signal to said second inputs of said pixel sensors coupled to receive said third signal;
   supplying a fourth signal to said second inputs of said pixel sensors coupled to receive said fourth signal;
   displaying output signals received from outputs of said pixel sensors;
   if a value of said first signal is greater than a value of said third signal, displaying said output signal corresponding to said third signal else displaying said output signal corresponding to said first signal;
   if a value of said second signal is greater than a value of said third signal, displaying said output signal corresponding to said third signal else displaying said output signal corresponding to said second signal;
   if a value of said first signal is greater than a value of said fourth signal, displaying said output signal corresponding to said fourth signal else displaying said output signal corresponding to said first signal; and
   if a value of said second signal is greater than a value of said fourth signal, displaying said output signal corresponding to said fourth signal else displaying said output signal corresponding to said second signal.

7. A system comprising:

a pixel sensor array, each pixel sensor having a first input and an output;

said pixel sensor array divided into columns, each first input of said pixel sensors within each of said columns are coupled in series, and each column is coupled alternatively to receive a first signal and a second signal respectively;

a generator coupled to said first inputs of said pixel sensors to generate said first and second signals, wherein said generator further comprises a first and second multiplexor, said first multiplexor coupled to said first inputs for receiving said first signal, said second multiplexor coupled to said first inputs for receiving said second signal, said first and second multiplexors selecting said first and second signals from a plurality of signals generated by said generator;

circuitry for generating images, said imaging circuitry coupled to said outputs of said pixel sensor array; and a memory coupled to said imaging circuitry for storing said images.

8. The system in claim 7, wherein said pixel sensors further comprises a second input, said pixel sensor array divided into rows, each second input of said pixel sensors within each of said rows are coupled in series, and each row is coupled alternatively to receive a third signal and a fourth signal respectively.

9. The system in claim 8, further comprising said generator coupled to said second inputs of said pixel sensors to generate said third and fourth signals; and a display arrangement including a display circuitry and a display device coupled to said outputs to display a pattern corresponding to said output signals.

10. The system of claim 9, further comprising a third and fourth multiplexor, said third multiplexor coupled to said second inputs for receiving said third signal and said fourth multiplexor coupled to said second inputs for receiving said fourth signal, said first, second, third and fourth multiplexors selecting said first, second, third and fourth signals from a plurality of signals generated by said generator.

11. A system comprising:

a pixel sensor array, each pixel sensor having a first input and a second input and an output;

said pixel sensor array divided into rows, each first input of said pixel sensors within each of said rows are coupled in series, and each row is coupled alternatively to receive a first signal and a second signal respectively and said second input coupled to receive a third signal wherein said first signal having a duration shorter than said second signal and said third signal changing in value when said first signal has terminated;

said pixel sensor array is further divided into columns, each second input of said pixel sensors within each of said columns are coupled in series, and each column is coupled alternatively to receive said third signal and a fourth signal respectively wherein said third and fourth signals change in value when said first signal has terminated;

a generator coupled to said first and second inputs of said pixel sensors to generate said first, second, third and fourth signals, wherein said generator further comprises a first, second, third and fourth multiplexor, said first multiplexor coupled to said first inputs for receiving said first signal, said second multiplexor coupled to said first inputs for receiving said second signal, said third multiplexor coupled to said second inputs for receiving said third signal and said fourth multiplexor coupled to said second inputs for receiving said fourth signal, said first, second, third and fourth multiplexors selecting said first, second, third and fourth signals from a plurality of signals generated by said generator; and a memory coupled to said imaging circuitry for storing said images.

12. The system in claim 11, wherein said first signal having a shorter duration than said second signal, said third and fourth signals changing in value when said first signal has terminated; and a display arrangement including a display circuitry and a display device coupled to said outputs to display a pattern according to said output signals.

13. An Apparatus comprising:

a plurality of pixel sensors, each pixel sensor having a first input and an output, wherein said plurality of pixel sensors are divided into columns, each first input of said pixel sensors within each of said columns being coupled in series, and each column being coupled alternatively to receive first and second signals respectively, said first inputs of said pixel sensors coupled alternatively to receive said first signal and said second signal respectively; and said outputs of said pixel sensors generating output signals corresponding to said first and second signals received at said first inputs;

a generator coupled to said first inputs of said pixel sensors to generate said first and second signals, wherein said generator further comprises a first and second multiplexor; and wherein said first multiplexor is coupled to said first inputs for receiving said first signal, and said second multiplexor is coupled to said first inputs for receiving said second signal, said first and second multiplexors selecting said first and second signals from a plurality of signals generated by said generator.

14. The apparatus of claim 13, wherein said pixel sensors further comprises a second input, said pixel sensors further divided into rows, each second input of said pixel sensors within each of said rows being coupled in series, and each row being coupled alternatively to receive a third signal and a fourth signal respectively.

15. The apparatus of claim 14, wherein said generator coupled to second inputs of said pixel sensors to generate said third and fourth signals, wherein said generator further comprises a third and fourth multiplexor, said third multiplexor coupled to said second inputs for receiving said third signal and said fourth multiplexor coupled to said second inputs for receiving said fourth signal, said third and fourth multiplexors selecting said third and fourth signals from a plurality of signals generated by said generator.

16. The apparatus in claim 15, wherein said first signal having a shorter duration than said second signal, said third and fourth signals changing in value when said first signal has terminated.

17. The apparatus of claim 13, further comprising a display arrangement including a display circuitry and a display device coupled to said outputs to display a pattern corresponding to said output signals.

18. The apparatus of claim 16, further comprising a display arrangement including a display circuitry and a display device coupled to said outputs to display a pattern corresponding to said output signals.

19. The apparatus in claim 18, wherein said pattern is a bar pattern.

20. The apparatus in claim 18, wherein said pattern is a quasi-checkerboard pattern.

21. The apparatus in claim 17, wherein said pattern is a bar pattern.

22. The apparatus in claim 17, wherein said pattern is a quasi-checkerboard pattern.

23. A method comprising:

coupling first inputs of a plurality of pixel sensors alternatively to receive a first signal and a second signal respectively;

coupling second inputs of said plurality of pixel sensors alternatively to receive a third signal and a fourth signal respectively;

supplying a first signal to said first inputs of said pixel sensors coupled to receive said first signal;

supplying a second signal to said first inputs of said pixel sensors coupled to receive said second signal, wherein said second signal has a value different from said first signal;

supplying a third signal to said second inputs of said pixel sensors coupled to receive said third signal;

supplying a fourth signal to said second inputs of said pixel sensors coupled to receive said fourth signal;

displaying output signals received from outputs of said pixel sensors;

if a value of said first signal is greater than a value of said third signal, displaying said output signal corresponding to said third signal else displaying said output signal corresponding to said first signal; and if a value of said second signal is greater than a value of said third signal, displaying said output signal corresponding to said third signal else displaying said output signal corresponding to said second signal.

24. The method of claim 23, further comprising:

dividing said plurality of pixel sensors into columns;

coupling each first input of said pixel sensors within each of said columns in series; and coupling each column alternatively to receive said first and second signals respectively.

25. The method of claim 24, further comprising:

dividing said plurality of pixel sensors into rows;

coupling each second input of said pixel sensors within each of said rows in series; and coupling each row alternatively to receive a third signal and a fourth signal respectively.

26. The method of claim 25, further comprising:

if a value of said first signal is greater than a value of said fourth signal, displaying said output signal corresponding to said fourth signal else displaying said output signal corresponding to said first signal; and if a value of said second signal is greater than a value of said fourth signal, displaying said output signal corresponding to said fourth signal else displaying said output signal corresponding to said second signal.

* * * * *